Dec. 10, 1935.

G. W. LAWRENCE 2,023,927

PARCEL POST SCALE

Filed Oct. 23, 1931

INVENTOR
George W. Lawrence;
BY
Clarence B. Foster
ATTORNEY

Dec. 10, 1935.   G. W. LAWRENCE   2,023,927
PARCEL POST SCALE
Filed Oct. 23, 1931   7 Sheets-Sheet 3

Fig.3.

INVENTOR
George W. Lawrence;
BY
Clarence B. Foster
ATTORNEY

Dec. 10, 1935.   G. W. LAWRENCE   2,023,927
PARCEL POST SCALE
Filed Oct. 23, 1931   7 Sheets-Sheet 4

INVENTOR
George W. Lawrence,
BY Clarence B. Foster
ATTORNEY

Dec. 10, 1935.   G. W. LAWRENCE   2,023,927
PARCEL POST SCALE
Filed Oct. 23, 1931   7 Sheets-Sheet 5

Fig. 5.

INVENTOR
George W. Lawrence,
BY
Clarence B. Foster
ATTORNEY

Fig. 6.

UNITED STATES PATENT OFFICE 2,023,927

PARCEL POST SCALE

George W. Lawrence, Los Angeles, Calif., assignor to William J. Pearson, Los Angeles, Calif.

Application October 23, 1931, Serial No. 570,635

7 Claims. (Cl. 265—36)

This invention relates to weighing scales, more particularly parcel post scales, designed to meet the special requirements of that character of work, and, to that end, very sensitive and accurate scale, combining these advantages with strength and simplicity of construction.

This scale is constructed to operate on the simple lever principle, wherein the fulcrum points of each beam are horizontal to the load bearing points of each beam, and wherein the lever suspension system comprises a main lever and a secondary lever, connected at the center by a link; the main lever is elongated at the end opposite the fork to a point sufficiently removed from the link to furnish the required movement to operate a modified conventional tare beam, used to balance the beam structure and to transmit movement from the main lever to the counter-balancing mechanism and indicating mechanism. The mechanism has a minimum of frictional contacts.

An object of my invention is to provide a parcel post scale which is peculiarly adapted to that particular work and which may be used in conjunction with a parcel post machine, or built into a casing with a parcel post machine, as a single operating unit.

An object of my invention is to provide a scale with the minimum of operating parts, and the consequent elimination of the friction caused by an accumulation of operating parts; to this end the connecting parts of the machine are simplified and the counter-balancing mechanism and indicating mechanism are included in one unit, thus constituting a single moving part.

An object of my invention is to provide a compensating device, preferably in the form of a pivot or toggle joint disposed between the scale platform and the bearing, for absorbing the jar of loads and the lateral sway of the platform and thus preventing excessive wear on the knife edge bearings supporting the platform, the bearing blocks supporting the knife edge bearings of the platform, pivoted on pins, to compensate for any unevenness of the knife edges setting to the blocks and present an equal bearing surface at all times.

An object of my invention is to provide a means of retaining the knife edges in proper lateral position relative to each bearing block at all times with the minimum amount of friction; to this end each knife edge has a bevel end face, the point of which is aligned with the knife edge; the only movement allowed is a rocking movement against a retaining finger contacting only the point of the bevel end of the knife edge.

In case of an extreme jar to or tipping of the scale or scale platform metallic straps extending from the bearing supports over the knife edge bearings prevent the knife edges from being raised from the bearing blocks.

An object of my invention is to provide means for transferring movement from the scale platform to the scale indicating mechanism with the minimum of friction; to this end I have provided a metallic ribbon connection between the scale lever and the cam of the indicating and counter-balancing unit; the cam is of the conventional compensating type acting in conjunction with the counterweight, which moves in an arc around the shaft to which it and the cam are secured; for simplicity of construction the indicating device is secured to the same shaft, and is operated thereby.

The proper balancing of this particular scale construction requires that the counterweight operate within an arc of seventy degrees, which necessitates the operation of the attached scale indicating mechanism within the same arc of seventy degrees; the figures and numerals carried on the chart on the indicating mechanism being necessarily of small size, their reading is facilitated by the provision of an elongated reading lens so disposed relative to the indicating mechanism that the hair line provided for determining a reading point of the chart will be directly over the zero mark when the scale platform is empty; the lens is so spaced from the chart as to provide such magnification of the characters thereon as will render them readily discernible at a glance; to facilitate reading when the natural light is insufficient or indirectly located, artificial illumination (in the form of electric lights within the casing of the machine) is so disposed that that portion of the scale chart which appears directly under the reading lens is illuminated thereby.

An object of my invention being to provide a scale of unusual sensitivity, the indicating mechanism, unless restrained, would oscillate unusually during the weighing process and would consume an unnecessary amount of time before coming to rest at the weighing point; to prevent this condition I have provided a dash pot of novel form, preferably comprising a plurality of piston plates secured to a piston rod, each having a predetermined clearance from the casing of the dash pot for the passage of the fluid contained therein, certain of the plates being provided with openings for the passage of the fluid and having their respective diameters increased proportionately, and the intervening plates being of a lesser proportional diameter and without openings; by this means the weight of the fluid against the plates acts as a retardant of movement, but there is sufficient freedom of flow of the fluid to permit the scale to position through cessation of its own movement rather than by friction within the dash pot, the weight of the fluid within the dash pot reversing against the plates therein at each stroke of the oscillation, providing equal resistance during the up and the down strokes of the piston.

Various other objects and advantages will be more fully apparent from the following description of the accompanying drawings which form a part of this disclosure and which illustrate a preferred form of embodiment of the invention.

Figure 1:
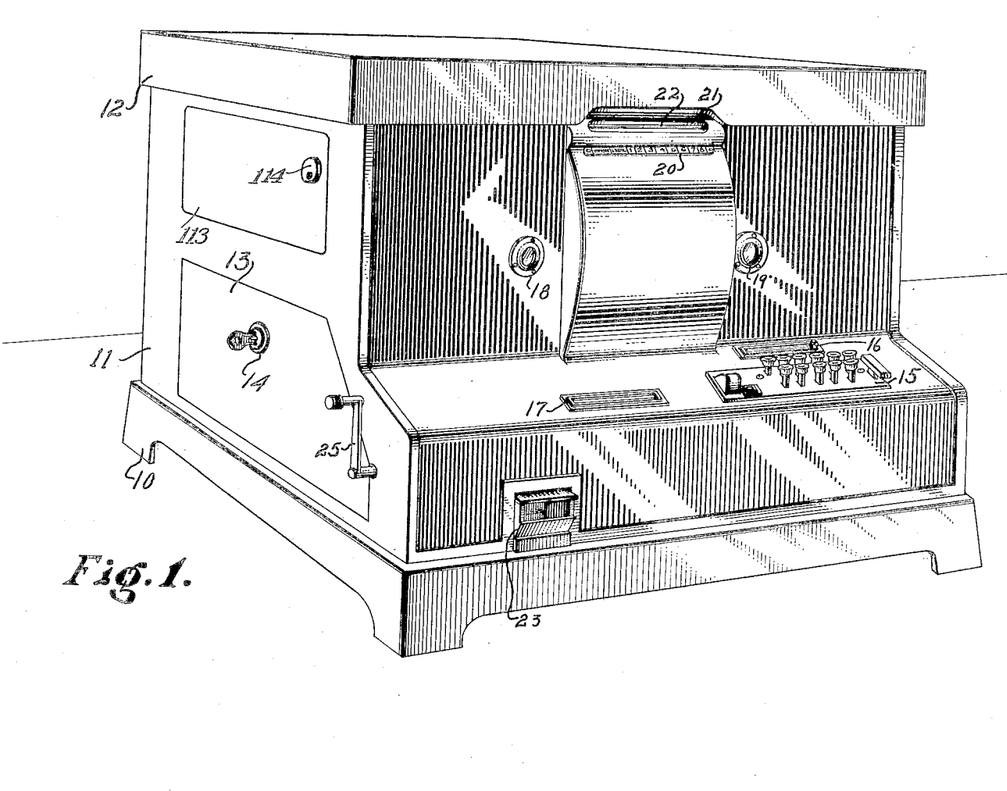
Fig. 1 is a perspective view of a parcel post machine.

The machine, mounted upon a base 10, includes an outer casing 11, a weighing platform 12 and enclosed supporting means for the platform; the casing 11 is provided with a door 13 secured by a key lock 14, for access to certain parts of the mechanism; the front section of the casing 11 is provided with a keyboard 15 for manual operation of the machine, a meter port 16 for reading the control meter and a port 17 for reading the registering meter, bull's eyes 18 and 19 for signal lights, and, for reading the scale indicator, an index 20 immediately below a reading port 21 containing a reading lens 22; at the lower portion of the front face of casing 11 is a port 23 through which projects the moistener unit 24 which provides for the discharge of stamps from the machine and which is operated by means of a handle 25.

Figure 2:
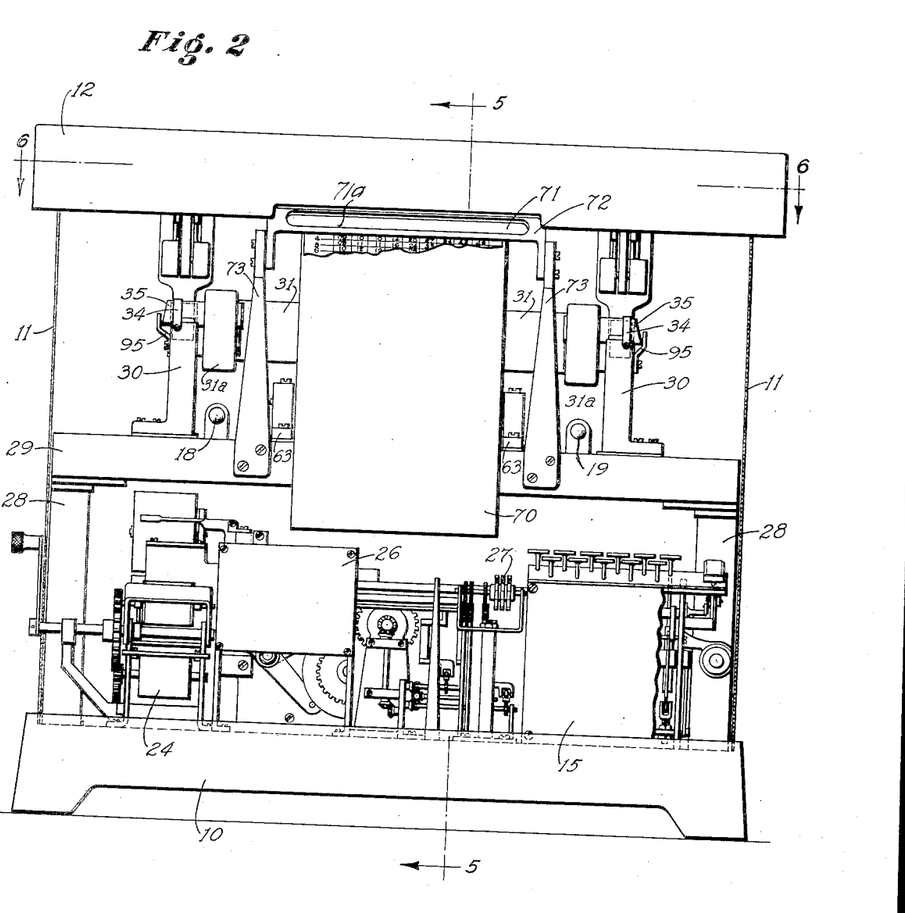
Fig. 2 is a front elevational view of a parcel post machine with the casing removed.

In Fig. 2 the base 10 is shown with the weighing platform 12 and the intervening mechanism, including moistener unit 24, recording meter 26, keyboard unit 15 and indicator dials 27, the parts of the parcel post machine visible from the front; scale supports 28 rising from base 10 support a frame 29 on which are mounted the various bearings and other parts of the scale structure, including fulcrum stands 30 supporting the main lever 31, and fulcrum stands 32 supporting secondary lever 33; all of the fulcrum stands are provided with bearing blocks 34, identical in structure, which carry knife edge bearings 35 mounted in the respective levers.

The main lever 31 and the secondary lever 33 are connected at a central point by means of link 36, which rests upon a knife edge 37 mounted in main lever 31 and supports a knife edge 38 mounted in secondary lever 33, and through which the load from the rear portion of the platform 12 is transferred to the main lever 31 and thence to the indicating mechanism.

The main lever 31 is further provided with knife edge bearings 39 and bearing blocks 40, which are similar in construction to the bearing blocks 34, these bearing blocks 40 being pivotally mounted by means of pins 41 in bearing supports 42, which constitute a compensating device to absorb the shock and lateral movement of the scale platform 12 when a load is placed thereon, each support 42 is hung, by links 44, from a support block 43; supports 42 identical in structure are located adjacent the four corners of the scale platform 12. The secondary lever 33 is provided with knife edge bearings 45, supporting blocks 46 pivotally mounted on pins 41 in supports 42.

The main lever 31 has an extension 47 at one end of a sufficient length to provide the required movement at that point and is provided with a knife edge bearing 48 which rests in one end of a connecting link 49, the upper end of which is supported by knife edge bearing 50 mounted in one end of tare beam 51; the fulcrum point of the tare beam 51 is at double knife edge bearing 52, which extends to each side of the tare beam 51 to rest upon bearing blocks 53 pivotally mounted in spaced fulcrum supports 54, mounted on subframe 55 of the main frame 29; the other end of the tare beam 51 is provided with a pivot point 56 into which is fitted an arcuate stirrup 57; a flexible steel tape 58 secured at one end to stirrup 57, rides on the cam face 59 of cam 60 and has its other end secured to the cam by an adjustable member 61; the cam 60 is secured to dial shaft 62, which is mounted at each end in roller bearings 63 mounted on a sub-frame 64 of the main frame 29. The adjustment of member 61 may be effected by means of screws which extend through an elongated slot (not shown) in member 61.

The dial shaft 62, mounted in bearings 63, supports the dial frame 65, the cam 60, and the adjustable counter-weight 66, thereby forming one unit of these members; counterweight 66 is adjustably mounted on screw 67. The dial frame 65 is provided at one end with a counter-balancing weight 68, and at the other end with the dial face 69, on which is mounted a printed dial chart 70 bearing the required inscriptions; reading of the small size figures necessarily used in this type of chart is facilitated by an elongated reading lens 71 which may be illuminated if desired, and which has a hair-line indicator 71A so disposed across the face of the chart 70 as to give an accurate reading of any point within the limits of the chart; the reading lens is mounted in a frame 72 upon a frame support 73 secured to the frame 29.

For the purpose of balancing the scale organization separately from the counter-balancing weight 66, I have provided on tare beam 51 a screw shaft 74 which carries a weight 75, the weight being locked in an adjusted position upon said screw shaft by any ordinary means, such as by the nuts 76.

Movement of the tare beam 51 in one direction is limited by a stop comprising an elongated rod 77 secured at one end to the frame 29 and carrying a member 78 mounted transversely upon and slidable upon said rod, this stop is adjustable from one position, in which it holds the tare beam against movement, to a second position allowing movement thereof. A stop member 79 comprising an elongated rod is secured to the frame 29 and has a curved extremity 80 adapted to contact with a bumper 81 secured to an end of the dial frame 65. By rotating the rod 79, the end of the curved extremity 80 may be positioned in the path of the bumper to limit the movement of the tare beam in one direction. These stop means 77—78 and 79—80 limit movement of the tare beam in opposite directions.

Figure 3:
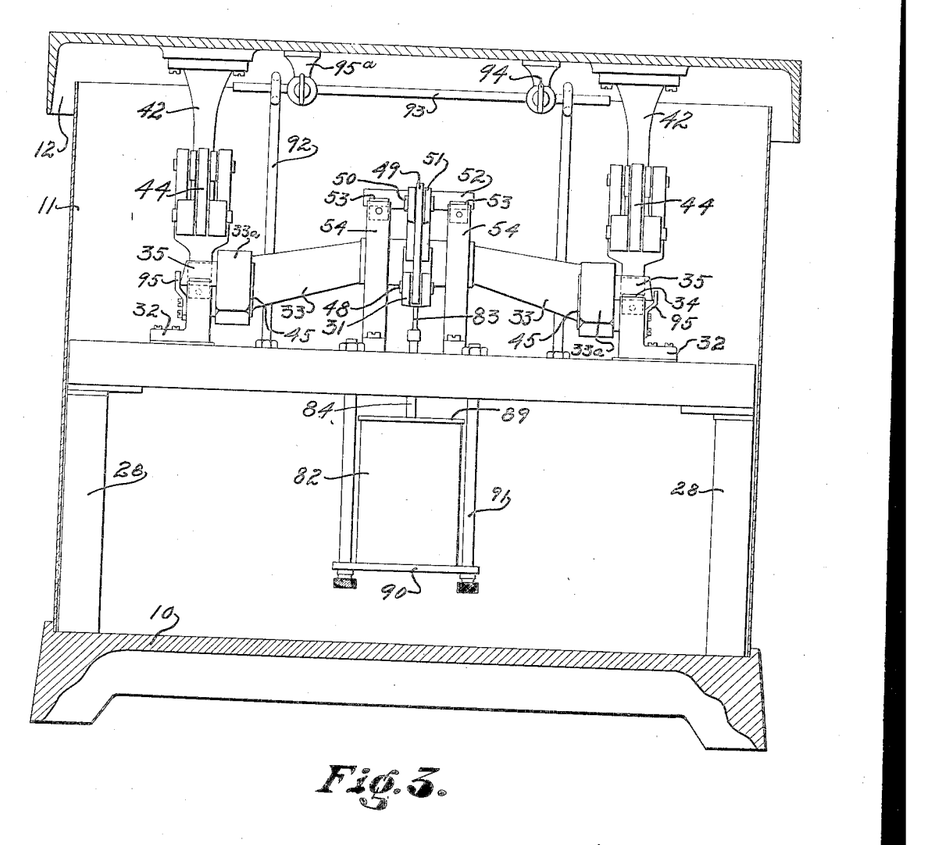
Fig. 3 is a rear elevational view of the scale mechanism of a parcel post machine.
Figure 4:
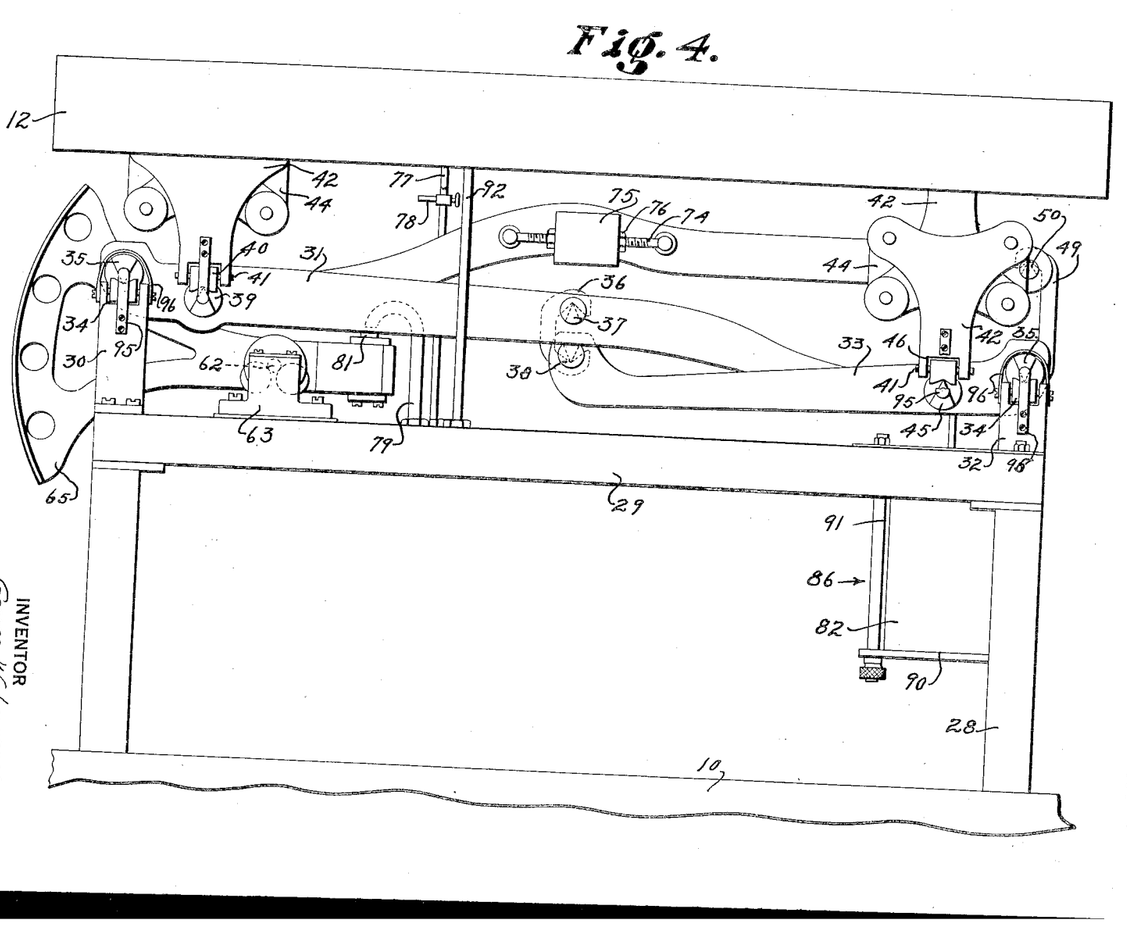
Fig. 4 is an elevational view from the right of the scale mechanism disclosed in Figs. 2 and 3.
Figure 5:
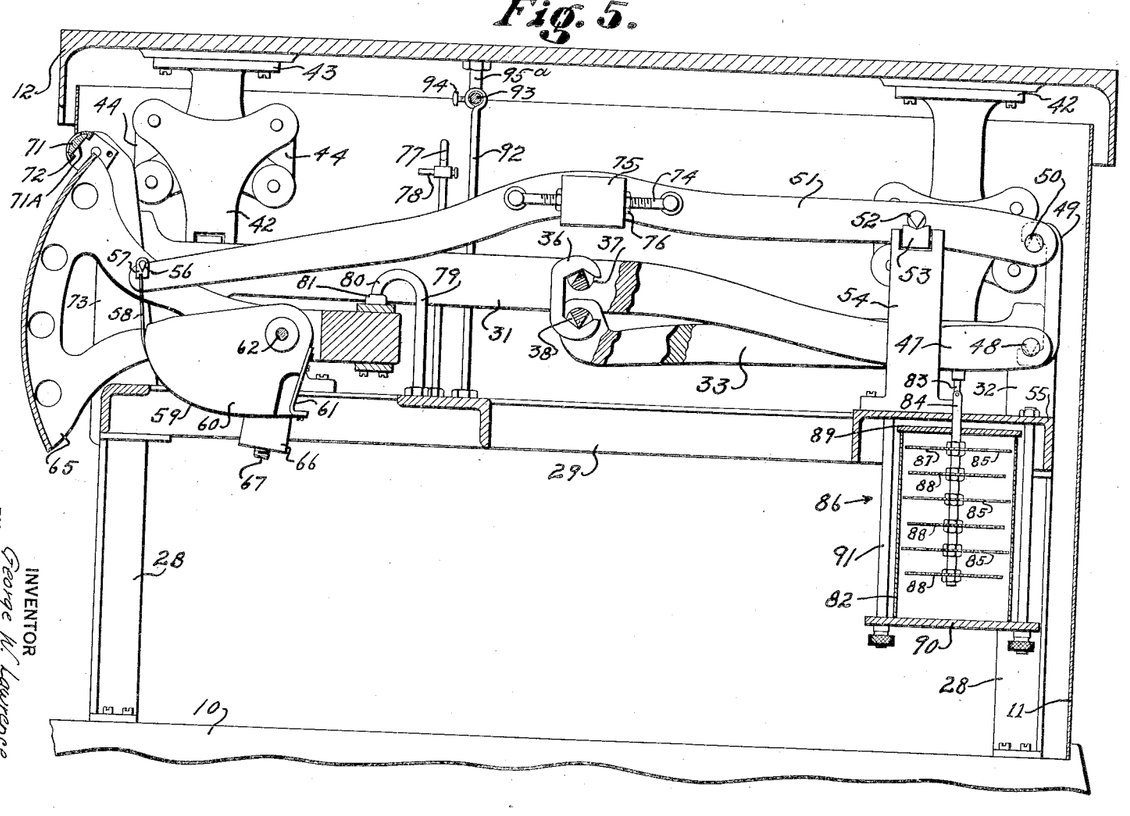
Fig. 5 is a sectional view of the machine from the right taken approximately on line 5—5 of Fig. 2.
Figure 6:
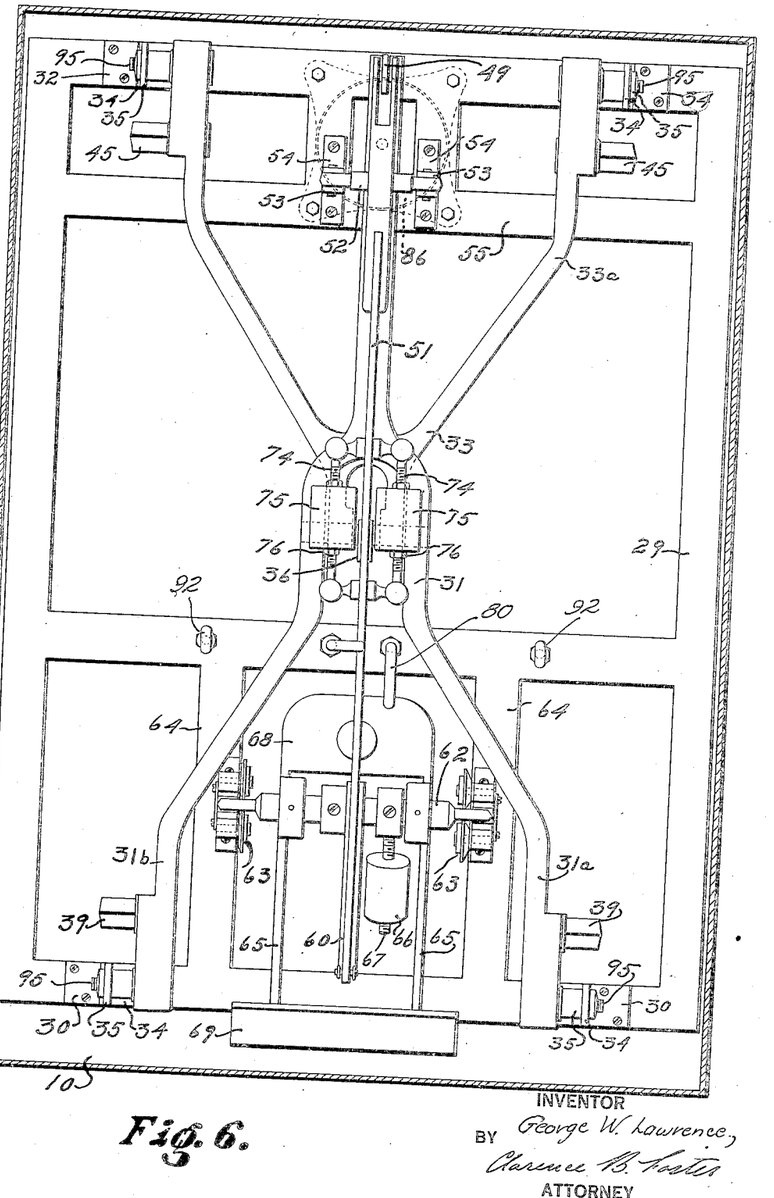
Fig. 6 is a plan view of the scale mechanism disclosed in Figs. 2, 3 and 4, as viewed from the top with the scale platform removed, approximately on line 6—6 of Fig. 2.
Figure 7:
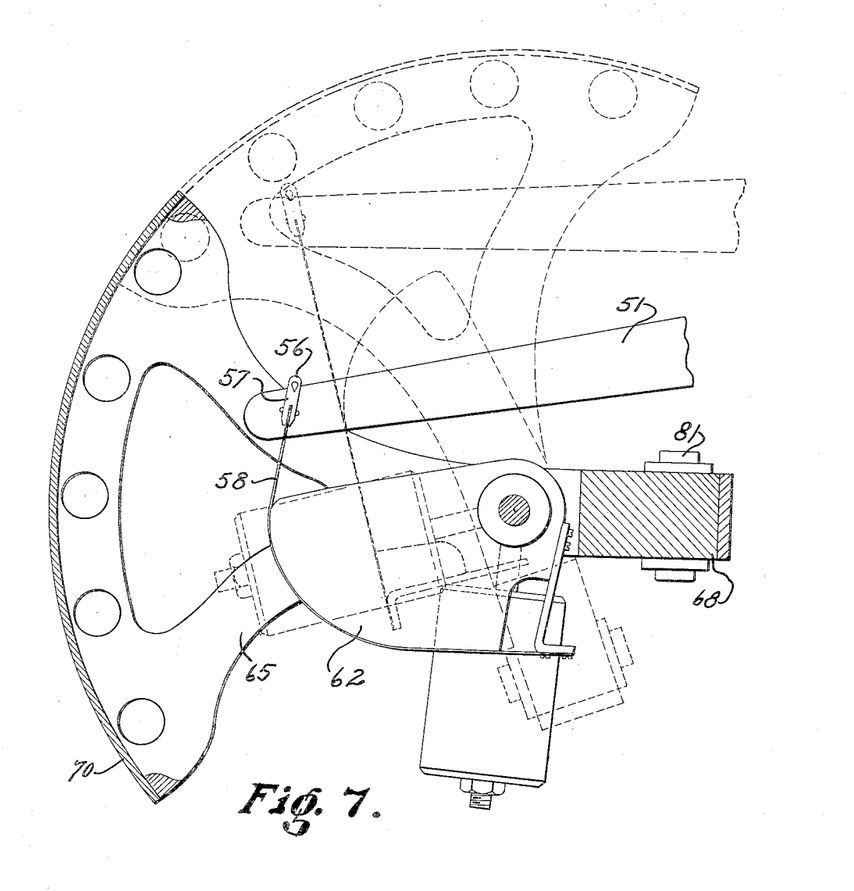
Fig. 7 is a diagrammatic view of the counterbalancing and indicating mechanism showing its zero position in solid lines and the opposite limit of its movement in broken lines.

At the rear of the machine a dash pot 82 (Figs. 3 and 5) is provided for damping the oscillations of the scale and bringing it to a non-oscillating point in the minimum of time, whereby a reading of the weight of any object placed on the platform may be quickly taken; this mechanism is attached to the rear end or extension 47 of the main lever 31 by means of a coupling 83, which allows for compensation in the lateral movement of the beam extension 47 within its arc; coupling 83 is further connected with a piston rod 84 to which are attached a plurality of spaced plates of varied construction, plates 85, of substantially the diameter of the dash pot case 86 and provided with transverse ports 87 for the passage of fluid in the dash pot, alternating with imperforate plates 88 which are of a less diameter; this construction provides a cushioning effect and a weight resistance of the dash pot fluid against the plates; the dash pot is provided with a cover 89 and has its base section 90 extended to contact the supporting posts 91, mounted in the frame 29.

To provide for accurate weighing of an article placed in any position on the scale platform 12, either at the center or near its corners, the bearing supports 42 are placed adjacent each of the corners of the scale platform 12; their pivot bearings 40, being thus separated, require a beam construction comprising the main lever 31 with widely bifurcated sections 31a and 31b fulcrumed upon the fulcrum supports 30; the secondary lever 33 is similarly widely bifurcated, and the two members 33a supported on fulcrum stands 32; these respective levers are provided with the knife edge bearings 39 and 45 respectively, upon which rest the bearing blocks 40 and 46 of the supports 42.

In a parcel post machine of this character it is desirable that the casing 11 rest upon the base plate 10 and be covered by the scale platform 12 and that the platform 12 be secured against removal except by authorized agents; this is accomplished by a locking means comprising a pair of bars 92 mounted in frame 29, each bar being provided at its upper end with a ring through which passes bar 93, held at either end by a set screw 94 passed through a ring mounting 95a secured to the platform 12; a locked door 113 in casing 11 affords access to the locking means for manipulation of the screws 94 and removal of the shaft 93 and to permit the platform 12 to be lifted from the machine and the casing 11 to be removed. The door 113 is provided with a suitable lock 114 and, if desired, may be placed on the opposite side of the machine from the position illustrated in Fig. 1.

To provide against excessive wear of the fulcrum knife edge bearings 35 and possible displacement of the bearings on the bearing blocks 34, I have provided a rigid finger 95 bearing against the projecting beveled points of the knife bearings 35; to prevent the possibility of the displacement of the same knife edges from their seats on blocks 34 through severe jar on the scale mechanism or through an accident, I have provided a retaining member 96 in the form of a metallic strap surrounding the knife edges and secured to the sides of each of the fulcrum stands 30 and 32.

Operation

In the operation of the parcel post weighing and stamp printing machine of which the above-described scale constitutes the weighing portion, the operator of the machine places a package upon the scale platform 12, upon the scale mechanism coming to a dead beat; the operator reads upon the chart 70 the weight of the package indicated by the position of the pounds scale beneath the reading lens 71; the operator, having determined from the address on the package the zone to which the package is addressed, then punches in on the keyboard 15 the required numbers, i. e. the zone, the weight in pounds, and the monetary value of the required postage, shown on the chart 70 in the proper column and computed from the weight and the zone number. The action of the scale is of the simple lever type wherein a weight placed upon the platform 12 transmits movement through the connected levers, the compensating cam 60 and its connected parts, giving consecutive readings on the scale dial chart 70 of the weights of any packages placed upon the scale.

This invention involves a nicety of adjustment and equipoise of the scale mechanism. The tare beam 51 has its fulcrum point at 52—53, is provided with an adjustable weight 75, and is associated with the cam 60 through the medium of the ribbon connection 58. When the tare beam moves a given amount, the cam will likewise move and the scale 65 will swing about a given arc. This movement constitutes a change of leverage between the several members and likewise a change in gravity positions. Hence, it becomes necessary to overcome any tendency of the tare beam to reach a self-induced balance point and the same is true for the scale.

By arranging the cam so that as it moves there is a constantly changing leverage, it is possible to overcome any tendency of the scale to reach a balance point or an equilibrium point and likewise to directly influence the tare beam and the other levers constituting the scale mechanism, with the result that the ribbon 58 can be disconnected and the tare beam balanced the desired amount, whereupon the ribbon 58 may be connected thereto and the cam with the associated scale balanced within certain degrees so that the scale will read zero when the platform is not sustaining any weight.

The balancing of the scale so that it will move over a given arc with a sequential movement to accurately register weights, involves considerable engineering; the mechanism described and illustrated herein accomplishes the objects of this invention in a simple, inexpensive and efficient manner, and in a manner which will allow continuous operation of the device without the necessity of frequent overhauls for the purpose of adjustment.

While the form of mechanism here shown and described, is admirably adapted to fulfill the objects primarily stated, it is to be understood that it is not intended to confine the invention to the one form of embodiment herein disclosed, for it is susceptible of embodiment in various forms, all coming within the scope of the claims which follow.

I claim:
1. In a device of the character disclosed, scale mechanism including an oscillating balancing lever; scale indicating mechanism comprising a dial, and a rockable frame supporting said dial; a rock shaft rigidly supporting said frame; a balancing weight in one end of said frame to balance said frame and said shaft; a cam secured to said shaft, said cam having a compensating cam face; a tape connected to one end of said balancing lever, adjustably connected to said cam and riding on the said compensating cam face; a variable resistant secured to said shaft normally resting in a position sufficiently off of a vertical center extended from the axis of said shaft to maintain said dial at a zero position against the pull of the tape on the cam by said balancing lever.

2. In a device of the character disclosed, scale mechanism including an oscillating balancing lever; scale indicating mechanism comprising a dial, and a rockable frame supporting said dial; a rock shaft rigidly supporting said frame, a balancing weight in one end of said frame to balance said frame and said shaft; a cam secured to said shaft; said cam having a compensating cam face; a tape connected at one end to one end of said balancing lever and riding on the said compensating cam face; means for detachably and adjustably securing the other end of said tape to said cam; a variable resistant secured to said shaft normally resting in a position sufficiently off of a vertical center extended from the axis of said shaft to maintain said dial at a zero position against the pull of the tape on the cam by said balancing lever, and said compensating cam face providing means to compensate the circular error of the variable resistant, during its travel when actuated by a weighing operation, to the pull on the tape by the balancing lever to provide an equal chart reading on said dial.

3. In a device of the character disclosed, scale mechanism including an oscillating balancing lever; scale indicating mechanism comprising a dial, and a rockable frame supporting said dial; a rock shaft rigidly supporting said frame; a balancing weight in one end of said frame to balance said frame and said shaft; a cam secured to said shaft, said cam having a compensating cam face; a tape connected to one end of said balancing lever riding on the said compensating cam face; means connecting said tape to said cam, said means being adjustable to vary the relation of said tape to said cam face for varying the compensating effect of said cam face; a variable resistant secured to said shaft normally resting in a position sufficiently off of a vertical center extended from the axis of said shaft to maintain said dial at a zero position against the pull of the tape on the cam by said balancing lever, said compensating cam face being disposed eccentrically to the axis of the said shaft.

4. In a device of the character described, a balancing arm, a main scale beam, a link connecting one end of said balancing arm to one end of said main scale beam, bearings on said beam and said arm engaged by said link, the other end of said main scale beam having radiating arms with spaced bearings thereon, and a secondary scale beam, a bearing on one end of said secondary scale beam, and a bearing on said main scale beam intermediate its ends, and a link engaging and connecting said last-named bearings, said secondary scale beam having at its opposite end radiating arms with spaced bearings thereon, whereby lateral rocking movement of said balancing arm and said scale beams is prevented.

5. In a device of the character described, scale mechanism including an oscillating balancing lever, scale indicating mechanism comprising a dial and a rockable frame supporting said dial, a shaft supporting said frame, a balancing weight on said frame, a cam secured to said shaft, said cam having an eccentric cam face, means connected to said balancing lever and adjustably connected to said cam to vary the relation of said means to said cam face and to vary the compensating effect of said cam face, said means being adapted to ride on said cam face for transmitting movement from the balancing lever to said dial frame, and variable means secured to said shaft for maintaining said dial frame at a zero position of said dial against the pull on said cam by said balancing lever.

6. In a device of the character described, scale mechanism including an oscillating lever, scale indicating mechanism comprising a shaft, a rockable frame supported on said shaft, a dial on said frame, a balancing weight on said frame, a cam secured to said shaft, said cam having an eccentric compensating cam face, means connected to said lever and adapted to ride on said cam face for transmitting movement from said lever to said dial frame, said means being adjustably connected to said cam to vary the relation of said means to said cam and to vary the compensating effect of said cam face, an adjustable counterweight secured to said shaft, and an adjustable weight on said lever.

7. In a device of the character described, scale mechanism, weight indicating mechanism comprising a dial, a shaft rockably supporting said dial, a cam secured to said shaft, said cam having an eccentric compensating cam face, a tape connected to said cam and to said scale mechanism and riding on said cam face, an adjustable member forming the connection of said tape to said cam for permitting lengthwise adjustment of said tape on and relative to said cam for varying the compensating effect of said cam face and a variable resistant secured to said shaft and normally in a position off center vertically for maintaining said dial at a zero position against the pull of the tape on said cam by said scale mechanism.

GEORGE W. LAWRENCE.